US007076396B2

(12) United States Patent
Klausner et al.

(10) Patent No.: US 7,076,396 B2
(45) Date of Patent: Jul. 11, 2006

(54) METHOD AND DEVICE FOR DETERMINING THE REMAINING SERVICEABLE LIFE OF A PRODUCT

(75) Inventors: Markus Klausner, Gerlingen (DE); Wolfgang Grimm, Allison Park, PA (US)

(73) Assignee: Robert Bosch GmbH, Stuttgart (DE)

( * ) Notice: Subject to any disclaimer, the term of this patent is extended or adjusted under 35 U.S.C. 154(b) by 205 days.

(21) Appl. No.: 10/204,113

(22) PCT Filed: Jan. 31, 2001

(86) PCT No.: PCT/DE01/00362

§ 371 (c)(1),
(2), (4) Date: Nov. 13, 2002

(87) PCT Pub. No.: WO01/61653

PCT Pub. Date: Aug. 23, 2001

(65) Prior Publication Data

US 2003/0101019 A1 May 29, 2003

(30) Foreign Application Priority Data

Feb. 17, 2000 (DE) ................................ 100 07 308

(51) Int. Cl.
*G06F 17/60* (2006.01)

(52) U.S. Cl. ....................... 702/181; 702/182; 702/183

(58) Field of Classification Search ................ 702/181, 702/34, 35, 58, 59, 81–84, 179, 180, 187, 702/182–185, 193; 701/29–31, 34, 35; 340/438, 340/500, 511, 679; 700/108, 109, 174, 175, 700/177; 73/577
See application file for complete search history.

(56) References Cited

U.S. PATENT DOCUMENTS 4,733,361 A 3/1988 Krieser et al. ................ 702/34
5,677,853 A * 10/1997 Tracy ......................... 702/179
6,349,268 B1 * 2/2002 Ketonen et al. ............ 702/130
6,490,543 B1 * 12/2002 Jaw ............................ 702/184
6,594,597 B1 * 7/2003 Schoch ........................ 702/81

FOREIGN PATENT DOCUMENTS

DE 195 16 481 11/1996
EP 0 612 643 8/1994
EP 0 661 673 7/1995
EP 0 863 490 9/1998

OTHER PUBLICATIONS

Translation of EP 0 863 490 A2, Jun. 2004, pp. 1-22.*
Translation of EP 0 612 643 A1, Jun. 2004, pp. 1-12.*

* cited by examiner

*Primary Examiner*—Hal Wachsman
(74) *Attorney, Agent, or Firm*—Kenyon & Kenyon

(57) ABSTRACT

A method and a device for acquiring performance quantities of a product, in particular until its technical failure, and for determining the remaining service life of the product are described. The determination of the remaining service life of the product, acquisition of service lives of the products and determination of service life threshold values are performed on the basis of performance quantities subdivided into classes (classified). Weighting factors are determined first and then these weighting factors are used to determine weighted, cumulative service lives and service life threshold values. The reliability of products is monitored in mass production.

12 Claims, 3 Drawing Sheets

METHOD AND DEVICE FOR DETERMINING THE REMAINING SERVICEABLE LIFE OF A PRODUCT

FIELD OF THE INVENTION

The present invention relates to a method and a device for determining the remaining service life of a product; the present invention also relates to a method and a device for acquiring the service life until technical failure of the product as well as methods and a device for determining service life threshold values of products as a function of certain time-variable performance quantities for monitoring the reliability of products, and finally the present invention also relates to a device arranged in a product whose reliability is to be monitored, this device being used to compare the actual service life of the product with service life threshold values.

BACKGROUND INFORMATION

German Published Patent Application No. 195 16 481 describes a method of determining a life. A control device for a motor vehicle is described, having a performance data memory in which performance quantities of the vehicle are stored, these quantities being capable of providing information regarding the probability of failure and/or the future reliability of the control device. Essential data on the life history of a control device is stored in the performance data memory to permit a conclusion to be drawn with regard to the reliability of the control device as needed.

SUMMARY OF THE INVENTION

An object of the present invention is to permit the most accurate possible estimate (not based on a model) of service life of any desired products having or accessing a performance data memory. Another object of the present invention is to achieve optimum acquisition of data and storage in a performance data memory to permit optimum utilization of the memory, in particular to save on memory.

To achieve this object, starting with a method of acquiring service lives until technical failure of a product, the present invention proposes that values of certain performance quantities be acquired, the value range of the individual performance quantities be subdivided into classes, and the service life be acquired as a function of the class in which the acquired value of the performance quantity falls.

In addition, the present invention proposes for achieving this object a method and a device for determining the remaining service life of a product until technical failure, values of a value range of at least one performance quantity of the product being acquired, the value range of the performance quantity being subdivided into classes and a service life of the product being determined for each class and stored in a performance data memory assigned to the product, preselectable weighting factors being assigned to the service lives and thus at least one weighted cumulative service life being determined for the product, the weighted cumulative service life being compared with at least one preselectable service life threshold value and the remaining service life of the product being determined on this basis.

The product whose service life until technical failure is acquired is designed, for example, as a control device or a subsystem (e.g., brakes, engine, transmission, steering, etc.) of a motor vehicle, for example. The products have a performance data memory and/or are assigned to such a memory, where the acquired performance quantities, i.e., the service lives, are stored and may be called up again as needed. The performance data memory preferably has a nonvolatile memory (e.g., an EEPROM or a flash EEPROM) as well as means for acquiring the performance quantities, i.e., the service lives. In the case of a motor vehicle, the performance data memory may be implemented in one or more control devices, for example.

Discrete system states (e.g., the number of starting operations, the number of emergency starts, the number of thermal shutdowns, etc.) as well as the time-variable performance quantities are acquired with the performance data memories. For example, sensor data such as temperature, current, voltage, pressure, etc. are acquired as performance quantities.

The value range is subdivided into a plurality of classes linearly or nonlinearly in the allowed value range of performance quantities under operating conditions. Extreme values that would result in immediate destruction of the product are outside the allowed value range. The class assignment is based on the classification of the entire value range in relevant load groups. The individual classes have different effects on the aging/wear of the product. The service life of the product for each performance quantity in each class is acquired in the performance data memory.

According to the present invention, the individual technical service life of a product is determined and the degree of wear at a given point in time is calculated on the basis of performance quantities subdivided into classes (so-called classified performance quantities). On the basis of the classified performance quantities, an especially reliable and accurate determination of the service life of a product is possible, the memory demand for the performance data memory being minimized because it is possible to refrain from acquiring time characteristics of the performance quantities. This permits particularly reliable preventive maintenance/repairs just before reaching the end of the technical service life.

According to a preferred refinement of the present invention, it is proposed that the values of the performance quantities be acquired at regular intervals in time and that a class counter of a certain class be incremented if the value of an acquired performance quantity falls in this class. Thus, after acquisition of the service lives, a service life histogram may be assigned to each performance quantity of a certain product, this histogram indicating the service life of the product for the performance quantity within a certain class. The size in bytes of the performance data memory required for storage of the performance data is obtained from the multiplication product of:

the number of performance quantities, the average number of classes per performance quantity, and the average number of bytes per class counter.

The method according to the present invention for acquiring service lives on the basis of classified performance quantities has special advantages in particular in determination of service life threshold values of products for monitoring the reliability of products. Therefore, according to an advantageous refinement of the present invention, a method of determining service life threshold values of the type defined above is proposed, wherein the service lives of the products until technical failure of the product are determined for the classes of the performance quantities by using the method according to the present invention;

weighting factors are assigned to the classes of the performance quantities;

the weighting factors are determined by solving an optimization problem $$\min\{f(x)\}, \text{ where } x=\{a\_ij, t\_ijk\}$$

taking into account the correlation between the individual performance quantities;

cumulative service lives for the individual performance quantities that are critical for the products are determined from the equation $$P\_iz\_crit = \overset{M\_i}{\underset{j=1}{SUM}}\{a\_ij \times t\_ijz\}$$

and for the individual products, the service life threshold values are determined from the equation $$\min\{P\_iz\_crit\}, \text{ where } i = 1 \ldots N \text{ or}$$

$$\frac{1}{N} \times \overset{N}{\underset{i=1}{SUM}}\{P\_iz\_crit\}, \text{ where } i = 1 \ldots N$$

The individual classes have different effects on the aging/wear of the products. Therefore, weighting factors which express the relative influence of a certain class of a certain performance quantity on the aging and/or wear of the product are assigned to the classes of performance quantities. The present invention proposes that the weighting factors be determined from a subset K of the products and this then be applied to subset Z of the products. In this way, the critical weighted cumulative service lives of the performance quantities for serial use may be determined for the products from subset S such that on reaching these service lives an end to the technical service life may be deduced.

The weighting factors are determined by solving an optimization problem $$\min\{f(X)\}, \text{ where } x=\{a\_ij, t\_ijk\}$$

taking into account the correlation between the individual performance quantities, where a_ij is the weighting factor assigned to class j of performance quantity i, and t_ijk is the service life of product k for class j of performance quantity i. The correlation between the performance quantities may be taken into account, for example, by the fact that the weighting factors are determined from an equation system in which the weighted cumulative service lives for each performance quantity are linked together by operators. The operators may be, for example, an AND link (forming a product), an OR link (forming a sum) or a fuzzy link (e.g., an intermediate state between AND and OR).

The critical cumulative service lives for the individual performance quantities which, when reached, permit the inference that the product in question is at the end of its technical service life are to be defined after the weighting factors have been determined by solving an optimization problem using suitable mathematical optimization algorithms. To do so, with the help of K products, a number of Z products are operated until technical failure, the weighting factors calculated from the K products being applied to the classified performance quantities of the Z products. The following equation is determined for all performance quantities and all Z products $$P\_iz\_crit = \overset{M\_i}{\underset{j=1}{SUM}}\{a\_ij \times t\_ijz\}$$

where P_iz_crit denotes the critical cumulative service life of product z of performance quantity i and t_ijz is the service life of product z for class j of performance quantity i. This yields Z vectors of the weighted cumulative service lives as follows $$Y\_z=\{P\_1z\_crit, P\_2z\_crit, \ldots, P\_Nz\_crit\},$$

where z=1 . . . Z.

The service life threshold values which, when reached, indicate that the product will soon be at the end of its technical life are determined for the individual products from the column minimums of matrix Y_z according to the equation $$\min\{P\_iz\_crit\}, \text{ where } i=1 \ldots N$$

or from the average of the column elements of matrix Y_z according to the equation $$\frac{1}{N} \times \overset{N}{\underset{i=1}{SUM}}\{P\_iz\_crit\}, \text{ where } i = 1 \ldots N.$$

This functions with the required reliability if the individual column elements are close enough together, i.e., if the standard deviation of the column elements is not too great. Freak values should not be taken into account in selecting the column minimums.

After the critical cumulative service lives for the individual performance quantities have been determined, the need for a repair, replacement or maintenance may be signaled by the product shortly before reaching the critical threshold value in the case of all mass-produced products equipped with performance data memories. As an alternative, the performance quantities stored in the product may be analyzed as part of a regular product maintenance program.

In summary, k=1 . . . K products are first operated until technical failure in order to be able to determine weighting factors a_ij. Then, weighting factors a_ij are integrated into the performance data memory of z=1 . . . Z products which are operated again until technical failure in order to determine the critical cumulative service lives P_iz_crit and to determine the service life threshold values by way of a minimum selection or the average of critical cumulative service lives P_iz_crit. Accordingly, the reliability of s=1 . . . S products is monitored in serial use, the actual service life of a product s being compared with a threshold value.

According to a preferred embodiment of the present invention, it is proposed that the weighting factors be determined by solving the optimization problem $$\underset{i=1}{\overset{N}{\min}}\left\{\overset{K}{\underset{k=1}{SUM}}\ \overset{M\_i}{\underset{j=1}{SUM}} ABS\{SUM\{a\_ij \times t\_ijk\} - 1\}\right\}$$

with the inequality secondary condition a_ij>0, where a_ij is the weighting factor assigned to class j of performance quantity i and t_ijk is the service life of product k for class j of performance quantity i. According to this embodiment, no correlation between the individual performance quantities is taken into account in calculation of the weighting factors. It is thus assumed that each performance quantity may result in technical destruction of the product regardless of the values of the other performance quantities.

If no correlation between the individual performance quantities is assumed for determination of the weighting factors, the largest ratio of a weighted cumulative service life for a performance quantity to the critical threshold value of the performance quantity may be interpreted as the degree of wear. The remaining residual life in % is then calculated according to the equation Remaining life [%]=1−Degree of wear [%].

According to an alternative embodiment of the present invention, it is proposed that the weighting factors be determined by solving the optimization problem $$\min_{v=1}^{K}\left\{\mathrm{SUM}_{\mu=1}^{K}\ \mathrm{SUM}_{\mu\neq v}^{N}\ \mathrm{ABS}_{i=1}^{M\_i}\left\{\mathrm{PROD}_{j=1}\{\mathrm{SUM}\{a\_ij\times t\_ij\,\mu^{N}\}\}-\mathrm{PROD}_{i=1}^{M\_i}\{\mathrm{SUM}_{j=1}\{a\_ij\times t\_ijv\}\}\right\}\right\}$$

with the inequality secondary condition a_ij>0. In this embodiment, the correlation between the individual performance quantities is taken into account. It is thus assumed that a plurality of performance quantities together result in technical destruction of the product. According to this embodiment, the performance quantities are linked together by pure AND links (forming a product). The weighting factors are determined so that the weighted class sums of each product linked by the AND operator are a minimum "distance" from one another.

In a third alternative embodiment, a plurality of performance quantities are linked at the level of individual classes. It is assumed here that a plurality of performance quantities within certain classes result in technical destruction of the product.

To achieve the object of the present invention, it is additionally proposed, starting from a device for acquiring the service lives until technical failure of a product, that the device have first means for acquiring the values of certain performance quantities at regular intervals in time, the value range of the individual performance quantities being subdivided into classes and the device having second means for acquisition of the service lives as a function of the class in which the acquired value of the performance quantity falls.

According to an advantageous refinement of the present invention, it is proposed that the second means shall increment a class counter of a certain class if the value of a performance quantity acquired falls in this class.

The device according to the present invention for acquiring service lives on the basis of classified performance quantities offers special advantages in particular when determining service life threshold values of products for monitoring the reliability of products. Therefore, according to an advantageous refinement of the present invention, a device for determining service life threshold values is proposed, wherein this device has means for carrying out the method according to the present invention.

To achieve the object of the present invention, starting from a device of the aforementioned type arranged in a product to be monitored, it is proposed that the service life threshold values be determined by the method according to the present invention. The performance data memory of the device may be particularly small because when the service life threshold values are determined according to the present invention, a memory-intensive acquisition of time characteristics of the performance quantities is unnecessary.

In addition, acquisition of performance data in classes has the advantage in particular that the memory may be utilized optimally, i.e., in particular only a small amount of memory is needed because no complicated acquisition of performance quantities over the entire time axis, i.e., with reference to the time axis, need be performed. Therefore, the present invention in particular the performance data acquisition may be implemented expediently as an additional functionality in a control device or in a device provided specifically for that purpose.

DETAILED DESCRIPTION

Figure 1:
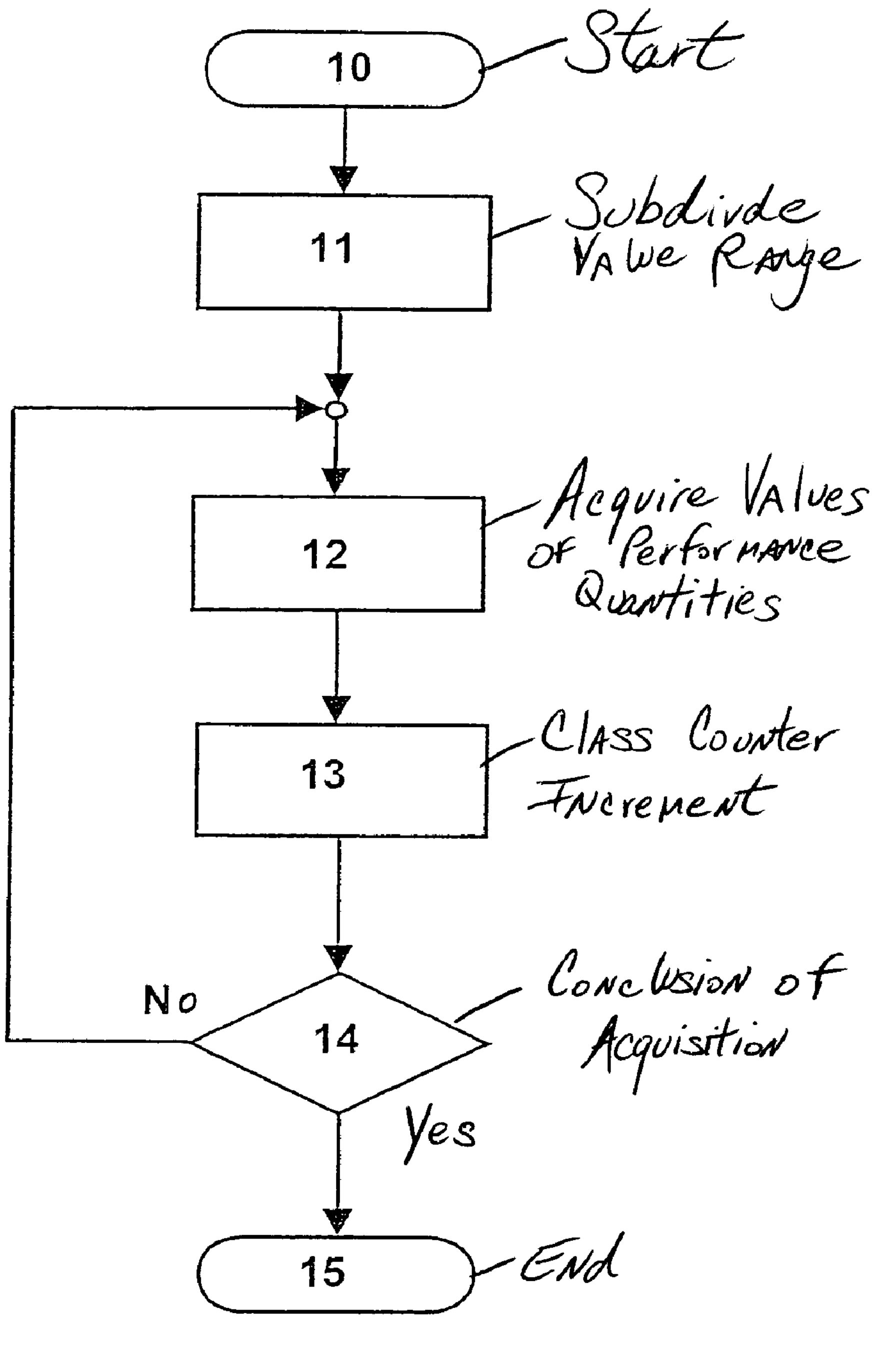
FIG. 1 shows a flow chart of a method according to the present invention for acquiring service lives until technical failure of a product according to a preferred embodiment.

FIG. 1 shows a flow chart of a method according to the present invention for acquiring service lives t_ijk of a product k=1 . . . K until technical failure of product k according to a preferred embodiment. Product k whose service life t_ijk is acquired is designed, for example, as a control device or a subsystem (e.g., brakes, engine, transmission, steering, etc.) of a motor vehicle. Product k has a performance data memory in which acquired performance quantities i=1 . . . N and/or service lives t_ijk are stored and may be called up again as needed. The performance data memory preferably has a nonvolatile memory (e.g., an EEPROM or a flash EEPROM) as well as means for acquisition of the performance quantities and/or service lives. In the case of a motor vehicle, the performance data memory may be implemented in one or more control devices, for example.

Discrete system states (e.g., number of starting operations, number of emergency starts, number of thermal shutdowns, etc.) and time-variable performance quantities i are acquired with the performance data memories. For example, sensor data such as temperature, current, voltage, pressure and the like are acquired as performance quantities i.

The method begins in a function block 10. In a function block 11, the value range allowed under operating conditions for individual performance quantities i to be acquired is subdivided linearly or nonlinearly into classes j=1 . . . M_i. Extreme values resulting in direct destruction of product k are outside the allowed value range. The class assignment is based on the division of the entire value range into relevant load groups. Individual classes j have different effects on the aging/wear of product k.

In a downstream function block 12, values of performance quantities i are acquired at regular intervals in time. Service lives t_ijk are acquired as a function of class j in which the acquired value of performance quantity i falls. To do so, a class counter of a certain class j is incremented in a function block 13 if the value of acquired performance quantity i falls in this class j. Each performance quantity i of a certain product k may thus be assigned a service life histogram after acquisition of service lives t_ijk, this histogram yielding service life t_ijk of product k for performance quantity i within a certain class j. Service lives t_ijk are obtained from the product of the count reading of the class counter and the time interval of the acquired values of performance quantities i.

In a downstream query block 14, a check is performed to determine whether the acquisition of service lives t_ijk is concluded. If not, the operation branches off back to function block 12. If the acquisition of service lives t_ijk is concluded, the operation branches off to the end of the method in function block 15.

Figure 2:
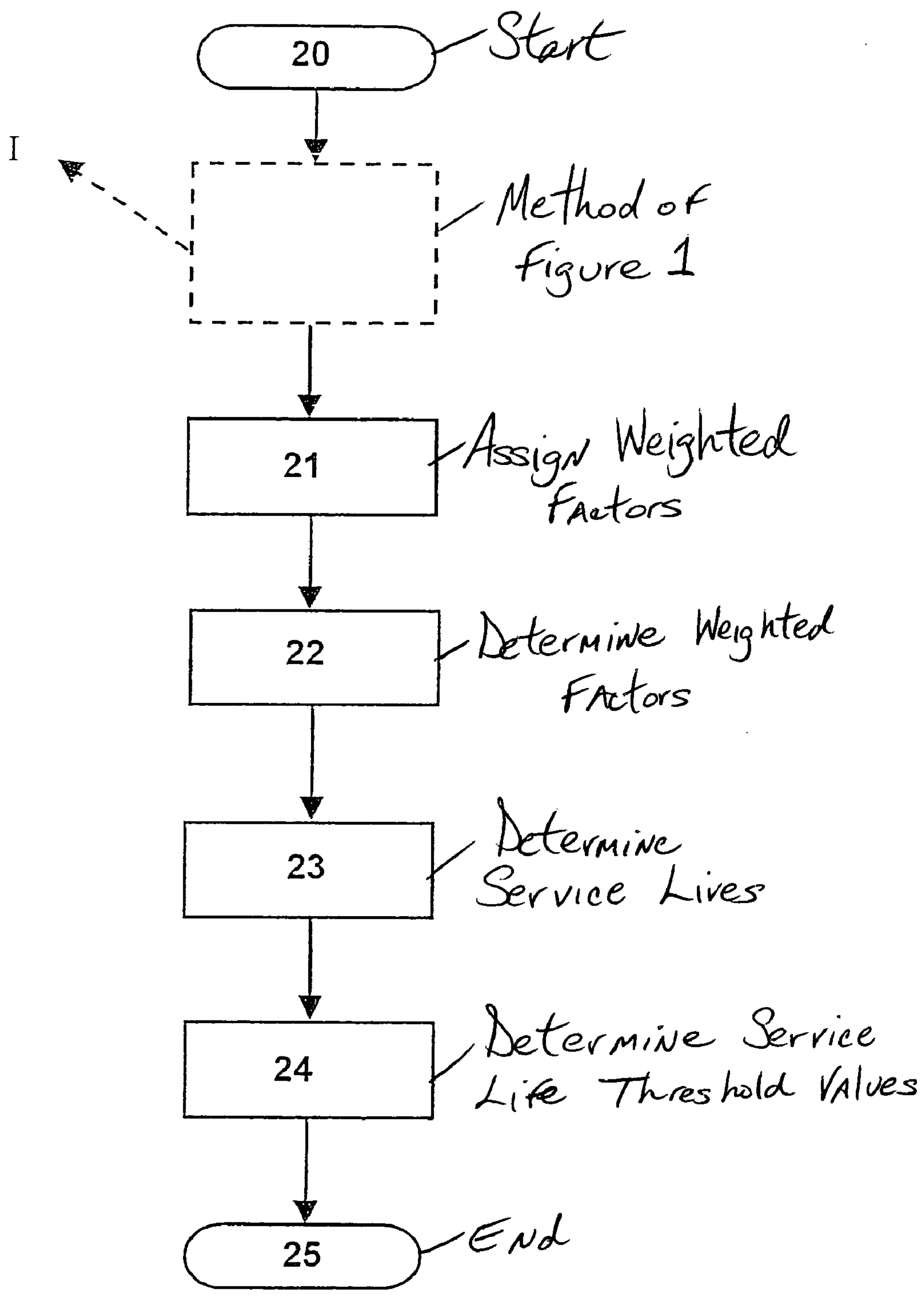
FIG. 2 shows a flow chart of a method according to the present invention for determining service life threshold values of products according to a preferred embodiment.

FIG. 2 shows a flow chart of a method according to the present invention for determining service life threshold values of products z according to a preferred embodiment. The method according to the present invention begins in a function block 20. Then service lives t_ijk of products k for class j of performance quantities i until technical failure of product k are first determined by using the method according to FIG. 1.

Then in a function block 21, weighting factors a_ij are assigned to the classes of performance quantities i. Since individual classes j have different effects on aging/wear of products k, weighting factors a_ij expressing the relative influence of a certain class j of a certain performance quantity i on the aging or wear of product k are assigned to classes j of performance quantities i.

In a downstream function block 22, weighting factors a_ij are determined by solving an optimization problem $$\min\{f(x)\},\ \text{where } x=\{a\_ij,\ t\_ijk\},$$

taking into account the correlation among individual performance quantities i. Weighting factors a_ij may be determined, for example, by solving the optimization problem $$\min_{i=1}^{N}\left\{\underset{k=1}{\overset{K}{\mathrm{SUM}}}\ \underset{j=1}{\overset{M\_i}{\mathrm{SUM}}}\mathrm{ABS}\{\mathrm{SUM}\{a\_ij\times t\_ijk\}-1\}\right\}$$

with inequality secondary condition a_ij>0. No correlation among individual performance quantities is taken into account, and it is assumed that each performance quantity i may result in technical failure of product k, regardless of the values of other performance quantities i.

As an alternative, weighting factors a_ij may also be determined by solving the optimization problem $$\min\left\{\underset{v=1}{\overset{K}{\mathrm{SUM}}}\underset{\mu=1}{\overset{K}{\mathrm{SUM}}}\mathrm{ABS}\left\{\underset{i=1}{\overset{N}{\mathrm{PROD}}}\left\{\underset{j=1}{\overset{M\_i}{\mathrm{SUM}}}\{a\_ij\times t\_ij\mu\}\right\}-\underset{i=1}{\overset{N}{\mathrm{PROD}}}\left\{\underset{j=1}{\overset{M\_i}{\mathrm{SUM}}}\{a\_ij\times t\_ijv\}\right\}\right\}\right\}\mu\neq v$$

with inequality secondary condition a_ij>0. The correlation among the individual performance quantities i is taken into account, and it is assumed that a plurality of performance quantities i jointly result in technical destruction of product k. Performance quantities i are linked together by pure AND links (forming a product) in this embodiment.

According to a third alternative, a linking of multiple performance quantities i at the level of individual classes j is conceivable. This is based on the assumption that multiple performance quantities i within certain classes j result in technical destruction of product k.

According to the present invention, weighting factors a_ij are determined from a subset K of products k, and these are then used for subset Z of products z. Therefore, critical cumulative service lives P_iz_crit of performance quantities i may be determined for serial use such that on reaching such a critical service life, it is possible to predict the end of the technical service life.

In a function block 23, cumulative service lives P_iz_crit for individual performance quantities i that are critical for products z may be determined from the equation:

$$P\_iz\_crit=\underset{j=1}{\overset{M\_i}{\mathrm{SUM}}}\{a\_ij\times t\_ijz\}$$

by operating products z until technical failure. This yields Z vectors of the weighted cumulative service lives $$Y\_z=(P\_1z\_crit,\ P\_2z\_crit,\ \ldots,\ P\_Nz\_crit),$$

where z=1 . . . Z.

Finally, in function block 24 the service life threshold values which, when reached, indicate that the end of the technical life of the product is imminent are determined for individual products z from the column minimums of matrix Y_z according to the equation:

$$\min\{P\_iz\_crit\},\ \text{where } i=1\ \ldots\ N$$

or from the average of the column elements of matrix Y_z according to the equation:

$$\frac{1}{N}\times\underset{i=1}{\overset{N}{\mathrm{SUM}}}\{P\_iz\_crit\},\ \text{where } i=1\ \ldots\ N$$

This then functions with the required reliability when the individual column elements are sufficiently close together, i.e., when the standard deviation in the column elements is small.

Freak values, if any, thus should not be taken into account in selecting the column minimums. In function block 25, the method for determining service life threshold values of products z is concluded. For determination of the service life threshold values, in addition to absolute or relative minimum selection and simple averaging, other methods and procedures such as sliding averaging or empirical averaging or harmonic averaging or formation of a meridian, etc. may also be used.

After determining critical cumulative service lives P_iz_crit for individual performance quantities i, the need for a repair, replacement or maintenance may be signaled by product s shortly before reaching the critical threshold value in the case of all mass-produced products s equipped with performance data memories. This may also take place in particular in the form of a self-diagnosis of the mass-produced product. As an alternative, the performance quantities stored in product s are analyzed as part of regular product maintenance. This product maintenance may also be performed, for example, in the case of a partial product of a vehicle or the vehicle itself in operation even in the form of onboard diagnosis.

Figure 3:
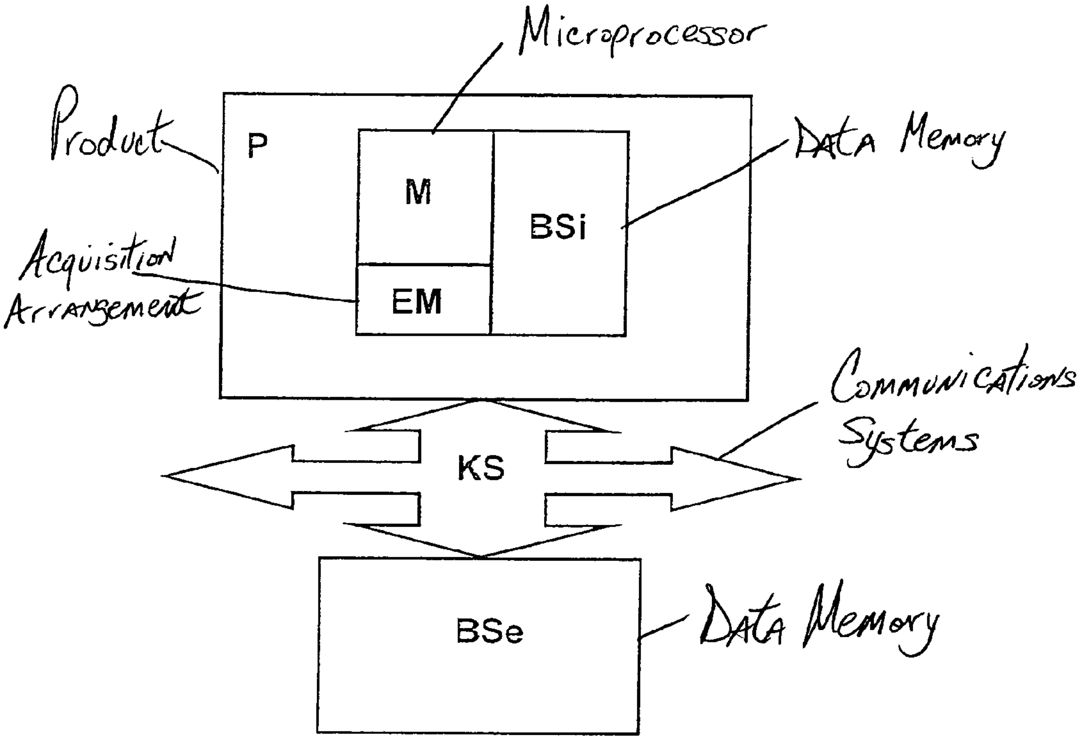
FIG. 3 shows a schematic diagram of a device according to the present invention.

FIG. 3 shows schematically one possible device according to the present invention, where P denotes the product itself. It is connected by a communications systems KS, in particular, a line system or a bus system to a performance data memory BSe external to the product. As an alternative, an internal performance data memory BSi may also be provided in the product itself. It is also possible for both memories to be present simultaneously and for a virtual memory of BSe and BSi to be formed, for example. The means used to implement the method according to the present invention as explained above are combined in M, e.g., in the form of a microcomputer or microcontroller. These means may also be present in a control device of a motor vehicle, for example, or may be introduced there.

Product P, whose service life is to be acquired, is designed, for example, as a control device or a subsystem (e.g., brakes, engine, transmission, steering, etc.) of a motor vehicle. Products P have a performance data memory BSi and/or they are assigned to such a memory (BSe) where the acquired performance quantities or service lives are stored and may be called up again as needed. The performance data memory preferably has a nonvolatile memory (e.g., an EEPROM or a flash memory) as well as means EM for acquisition of the performance quantities, i.e., the service lives. In the case of a motor vehicle, the performance data memory may be implemented in the form of one or more control devices, for example. Acquisition means EM acquire their information via communications system KS, for example, or other interfaces of the product, e.g., to other sensors or actuators. The analysis, the service life acquisition, service life determination by threshold value comparison, etc., are performed in particular by means M, which also initiate or perform the signaling or initiation of other measures. Acquisition means EM and means M may also be used in combination and may likewise be assigned to the performance data memories in a targeted manner, i.e., integrated into them.

Discrete system states (e.g., number of starting operations, number of emergency starts, number of thermal shutdowns, etc.) and the time-variable performance quantities are acquired with the performance data memories. For example, sensor data such as the temperature, current, voltage, pressure and the like may be acquired as performance quantities. The sensor system required for this is interfaced via communications system KS, for example, or is connected to the product by other interfaces. Depending on the product, the sensor system may also be partially or completely integrated into the product. The same is also true of actuators which supply information according to the present invention in particular.

Thus, with all mass-produced products s equipped with performance data memories, the need for repair, replacement or maintenance may be signaled by product s shortly before reaching the critical threshold value. This may also take place in particular in the form of a self-diagnosis of mass-produced products, e.g., through performance data memory having integrated means M, i.e., acquisition means EM.

What is claimed is:

1. A method of determining a service life of a product, comprising:

acquiring a value of a value range of at least one performance quantity of the product;

subdividing the value range of the at least one performance quantity; and acquiring the service life as a function of a class of performance quantities into which the acquired value of the at least one performance quantity falls;

wherein the at least one performance quantity includes at least one discrete system state, a number of starting operations, a number of emergency starts, a number of thermal shutdowns, and a time-variable performance quantity.

2. The method as recited in claim 1, further comprising:

acquiring the value of the at least one performance quantity at regular intervals in time; and incrementing a class counter of the class if the acquired value falls into the class.

3. The method as recited in claim 1, wherein:

weighting factors are determined by solving the optimization problem $$\min\left\{\underset{i=1}{\overset{N}{\mathrm{SUM}}}\underset{k=1}{\overset{K}{\mathrm{SUM}}}\mathrm{ABS}\left\{\underset{j=1}{\overset{M\_i}{\mathrm{SUM}}}\{a\_ij\times t\_ijk\}-1\right\}\right\}$$

with the inequality secondary condition a_ij>0;

wherein a_ij includes weighting factors assigned to class j of performance quantity i, t_ijk includes service life of product k for class j of performance quantity i, classes include j=1 . . . M_i, product includes k=1 . . . K, and performance quantities include i=1 . . . N.

4. The method as recited in claim 1, wherein:

weighting factors are determined by solving the optimization problem $$\min\left\{\underset{v=1}{\overset{K}{\mathrm{SUM}}}\underset{\mu=1}{\overset{K}{\mathrm{SUM}}}\mathrm{ABS}\left\{\underset{i=1}{\overset{N}{\mathrm{PROD}}}\left\{\underset{j=1}{\overset{M\_i}{\mathrm{SUM}}}\{a\_ij\times t\_ij\}\right\}-\underset{i=1}{\overset{N}{\mathrm{PROD}}}\left\{\underset{j=1}{\overset{M\_i}{\mathrm{SUM}}}\{a\_ij\times t\_ijv\}\right\}\right\}\right\}\mu\neq v$$

with the inequality secondary condition a_ij>0;

wherein a_ij includes weighting factors assigned to class j of performance quantity i, t_ijk includes service life of product k for class j of performance quantity i, classes include j=1 . . . M_i, product includes k=1 . . . K, and performance quantities include i=1 . . . N.

5. A method of determining a remaining service life of a product until technical failure, comprising:

determining an initial service life of the product by:

acquiring a value of a value range of at least one performance quantity of the product, subdividing the value range of the at least one performance quantity, and acquiring the initial service life as a function of a class into which the acquired value of the at least one performance quantity falls;

determining the initial service life of the product for each class;

storing the determined initial service life in a performance data memory assigned to the product;

assigning preselectable weighting factors to multiple service lives in order to determine at least one weighted, cumulative service life for the product;

comparing the at least one weighted, cumulative service life with at least one preselectable service life threshold value; and determining the remaining service life of the product from the comparison of the at least one weighted, cumulative service life with the at least one preselectable service life threshold value.

6. The method as recited in claim 5, wherein:

the determining of the remaining service life is performed in the product itself in the form of a self-diagnosis of the product, and one of before and when the at least one weighted, cumulative service life reaches the at least one preselectable service life threshold value, signaling that the at least one weighted, cumulative service life has reached the at least one preselectable service life threshold value.

7. A method of determining a service life threshold value of a product for monitoring a reliability of the product by comparing a service life with a threshold value, comprising:

storing at least one of values and the service lives according to classes of preselectable performance quantities of the product in a performance data memory assigned to the product;

operating a first subset of the product until technical failure, so that the service lives of the classes of preselectable performance quantities of the product are determined;

determining a weighting factor for each class and each performance quantity therefrom, the weighting factor reflecting an influence until technical failure of the product of the respective class and performance quantity;

operating a second subset of the product until technical failure, the weighting factor determined from the first subset being applied to the second subset;

determining a critical service life for each performance quantity over all classes in the second subset of the product; and determining the service life threshold value from critical service lives over all classes of all performance quantities.

8. A method of determining service life threshold values of products as a function of certain time-variable performance quantities for monitoring a reliability of the products in which service lives of the products are compared with a threshold value, comprising:

determining the service lives of the products until technical failure of the product for classes of the performance quantities by:

acquiring a value of a value range of the performance quantities of the products, subdividing the value range of the performance quantities, and acquiring the service lives as a function of one of a plurality of classes into which the acquired value of the performance quantities falls;

assigning weighting factors to the classes of the performance quantities;

determining the weighting factors by solving an optimization problem min {f(x)}, where x={a_ij, t_ijk} taking into account a correlation among the performance quantities;

determining cumulative service lives for the performance quantities that are critical for the products from the equation:

$$\text{P\_iz\_crit} = \underset{j=1}{\overset{\text{M\_i}}{\text{SUM}}}\{\text{a\_ij} \times \text{t\_ijz}\};$$

and for the products, determining the service life threshold values from the equation:

$$\min\{\text{P\_iz\_crit}\},\ \text{where } i = 1 \ldots N \text{ or } 1\ N - \times \underset{i=1}{\overset{N}{\text{SUM}}}\{\text{P\_iz\_crit}\},$$

$$\text{where } i = 1 \ldots N$$

wherein a_ij includes weighting factors assigned to class j of performance quantity i, t_ijk includes service life of product k for class j of performance quantity i, classes include j=1 . . . M_i, P_iz_crit includes a critical cumulative service life of product z of performance quantity i, and performance quantities include i=1 . . . N.

9. A device for determining a service life of a product, comprising:

an arrangement for acquiring a value of a value range of at least one performance quantity of the product at regular intervals in time;

an arrangement for subdividing the value range of the at least one performance quantity into classes; and an arrangement for acquiring the service life as a function of the class into which the acquired value of the at least one performance quantity falls;

wherein the at least one performance quantity includes at least one discrete system state, a number of starting operations, a number of emergency starts, a number of thermal shutdowns, and a time-variable performance quantity.

10. The device as recited in claim 9, wherein:

the arrangement for acquiring the service life increments a class counter of the class if the acquired value of the at least one performance quantity falls into the class.

11. A device for determining a remaining service life of a product until technical failure, comprising:

an arrangement for determining an initial service life of the product including:

an arrangement for acquiring a value of a value range of at least one performance quantity of the product, an arrangement for subdividing the value range of the at least one performance quantity, and an arrangement for acquiring the initial service life as a function of a class into which the acquired value of the at least one performance quantity falls;

an arrangement for determining the initial service life of the product for each class;

an arrangement for storing the determined initial service life in a performance data memory assigned to the product;

an arrangement for assigning preselectable weighting factors to multiple service lives in order to determine at least one weighted, cumulative service life for the product;

an arrangement for comparing the at least one weighted, cumulative service life with at least one preselectable service life threshold value; and an arrangement for determining from the at least one weighted, cumulative service life the remaining service life of the product.

12. A device for determining a service life threshold value of a product for monitoring a reliability of the product by comparing a service life with a threshold value, comprising:

an arrangement for storing at least one of values and the service lives according to classes in a performance data memory assigned to the product;

an arrangement for operating a first subset of the product that is operated until technical failure, so that the service lives of the classes of preselectable performance quantities of the product are determined;

an arrangement for determining a weighting factor for each class and each preselectable performance quantity therefrom, the weighting factor reflecting an influence until technical failure of the product of the respective class and preselectable performance quantity;

an arrangement for operating a second subset of the product until technical failure, the weighting factor determined from the first subset being applied to the second subset;

an arrangement for determining a critical service life for each preselectable performance quantity over all classes in the second subset of the product; and an arrangement for determining the service life threshold value from critical service lives over all classes of all preselectable performance quantities.

* * * * *